United States Patent
Parkvall et al.

(10) Patent No.: US 9,781,690 B2
(45) Date of Patent: Oct. 3, 2017

(54) USER EQUIPMENT, A NETWORK NODE AND METHODS THEREIN FOR PERFORMING AND ENABLING DEVICE-TO-DEVICE (D2D) COMMUNICATION IN A RADIO COMMUNICATIONS NETWORK

(71) Applicant: Telefonaktiebolaget L M Ericsson (publ), Stockholm (SE)

(72) Inventors: Stefan Parkvall, Bromma (SE); Bengt Lindoff, Bjärred (SE); Qianxi Lu, Beijing (CN); Stefano Sorrentino, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 93 days.

(21) Appl. No.: 14/358,849

(22) PCT Filed: Apr. 10, 2014

(86) PCT No.: PCT/SE2014/050440
§ 371 (c)(1),
(2) Date: May 16, 2014

(87) PCT Pub. No.: WO2014/168570
PCT Pub. Date: Oct. 16, 2014

(65) Prior Publication Data
US 2015/0215881 A1    Jul. 30, 2015

Related U.S. Application Data

(60) Provisional application No. 61/810,304, filed on Apr. 10, 2013.

(51) Int. Cl.
*H04W 56/00* (2009.01)
*H04W 76/02* (2009.01)

(52) U.S. Cl.
CPC ....... *H04W 56/001* (2013.01); *H04W 56/002* (2013.01); *H04W 56/0045* (2013.01); *H04W 76/023* (2013.01)

(58) Field of Classification Search
CPC ............. H04W 76/046; H04W 76/048; H04W 76/023; H04W 76/02; H04W 76/00;
(Continued)

(56) References Cited

U.S. PATENT DOCUMENTS

| 5,471,670 A | 11/1995 | Hess et al. |
| 2012/0106517 A1 | 5/2012 | Charbit et al. |

(Continued)

FOREIGN PATENT DOCUMENTS

| EP | 2367386 A1 | 9/2011 |
| GB | 2491114 A | 11/2012 |

(Continued)

OTHER PUBLICATIONS

International Search Report and Written Opinion for PCT/SE2014/050440, dated Oct. 9, 2014, 10 pages.
(Continued)

*Primary Examiner* — Charles C Jiang
*Assistant Examiner* — Rose Clark
(74) *Attorney, Agent, or Firm* — Withrow & Terranova, PLLC (57) ABSTRACT

A method performed by a first user equipment for performing Device-to-Device, D2D, communications with a second user equipment is provided. The first user equipment determines that a valid timing reference is not present in the first user equipment. Also, the first user equipment determines whether a preconfigured timing advance can be used in the D2D communication. Then, when determined that the preconfigured timing advance can be used, the first user equipment transmits a D2D signal to the second user equipment (Continued)

with a timing using the preconfigured timing advance to perform D2D communication.

A user equipment, a network node and method therein for enabling D2D communications between user equipments in a radio communications network are also provided.

16 Claims, 6 Drawing Sheets

(58) Field of Classification Search
CPC ........... H04W 74/0833; H04W 74/002; H04W 74/08; H04W 74/008; H04W 74/0891; H04W 74/00; H04W 72/048; H04W 72/121; H04W 56/00; H04W 56/004; H04W 56/002; H04W 56/001; H04W 56/0045
See application file for complete search history.

(56) References Cited

U.S. PATENT DOCUMENTS

| | | | | |
|---|---|---|---|---|
| 2012/0155310 | A1* | 6/2012 | Kreuzer | H04W 52/146 370/252 |
| 2014/0036890 | A1* | 2/2014 | Iwamura | H04W 56/002 370/336 |
| 2014/0050153 | A1* | 2/2014 | Iwamura | H04W 56/0015 370/328 |
| 2014/0314057 | A1* | 10/2014 | Van Phan | H04W 56/0045 370/336 |
| 2015/0023316 | A1* | 1/2015 | Ko | H04L 5/0032 370/330 |
| 2015/0036558 | A1* | 2/2015 | Ko | H04L 5/0032 370/280 |
| 2015/0036597 | A1* | 2/2015 | Chou | H04W 52/243 370/329 |
| 2015/0057006 | A1* | 2/2015 | Gao | H04W 72/04 455/450 |
| 2015/0245395 | A1* | 8/2015 | Yamazaki | H04W 56/00 455/426.1 |
| 2015/0382252 | A1* | 12/2015 | Yu | H04W 8/005 370/331 |

FOREIGN PATENT DOCUMENTS

| | | |
|---|---|---|
| GB | 2494460 A | 3/2013 |
| RU | 2117396 C1 | 8/1998 |
| RU | 2286030 C1 | 10/2006 |
| RU | 2530153 C2 | 10/2014 |
| WO | 2007110483 A1 | 10/2007 |
| WO | 2010035100 A1 | 4/2010 |
| WO | 2010035199 A2 | 4/2010 |
| WO | 2010038139 A1 | 4/2010 |
| WO | 2013048296 A1 | 4/2013 |

OTHER PUBLICATIONS

International Preliminary Report on Patentability for PCT/SE2014/050440, dated Jul. 13, 2015, 7 pages.
Decision of Grant and Search Report for Russian Patent Application No. 2015148106/08(074036), dated Mar. 2, 2017, 24 pages.

* cited by examiner

USER EQUIPMENT, A NETWORK NODE AND METHODS THEREIN FOR PERFORMING AND ENABLING DEVICE-TO-DEVICE (D2D) COMMUNICATION IN A RADIO COMMUNICATIONS NETWORK

This application is a 35 U.S.C. §371 national phase filing of International Application No. PCT/SE2014/050440, filed Apr. 10, 2014, the disclosure of which is incorporated herein by reference in its entirety.

TECHNICAL FIELD

Embodiments herein relate to Device-to-Device (D2D) communication in a radio communications network. In particular, embodiments herein relate to a user equipment and a method therein for performing D2D communication with another user equipment in a radio communications network. Embodiments herein further relate to a network node and a method therein for enabling D2D communication between user equipments in a radio communications network.

BACKGROUND

In a typical radio communications network, wireless terminals, also known as mobile stations, terminals and/or user equipments, UEs, communicate via a Radio Access Network, RAN, to one or more core networks, CNs. The radio access network covers a geographical area which is divided into cell areas, with each cell area being served by a base station, e.g. a radio base station, RBS, or network node, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially "flat" architecture comprising radio base station nodes without reporting to RNCs.

Device discovery is a well-known and widely used component of many existing wireless technologies, including ad hoc and cellular networks. Examples comprise Bluetooth and several variants of the IEEE 802.11 standards suite, such as, e.g. WiFi Direct. These systems operate in the unlicensed spectrum.

Recently, D2D communications as an underlay to cellular or radio communications networks have been proposed as a means to take advantage of the proximity of communicating devices, i.e. UEs, and at the same time to allow devices to operate in a controlled interference environment.

Typically, it is suggested that such D2D communication should share the same spectrum as the cellular or radio communication network. This may be performed, for example, by reserving some of the cellular or radio uplink, UL, resources for D2D communication purposes. Another solution may comprise allocating a dedicated spectrum for D2D communication, which is a less likely alternative as spectrum is a scarce resource; particularly, since dynamic sharing between D2D services and cellular/radio services is more flexible and provides a higher spectrum efficiency.

It becomes clear that for D2D communication to occur, the UE must have the same understanding of UL subframe timing as the cellular or radio communications network. Otherwise, they might overlap in time with the cellular or radio transmissions.

In LTE, like in several other cellular standards, a so-called Timing Advance, TA, is used to ensure that UL transmissions from different UEs are received at the same time, approximately, at the base station. Thereby, orthogonality between the UEs is maintained.

Figure 1:
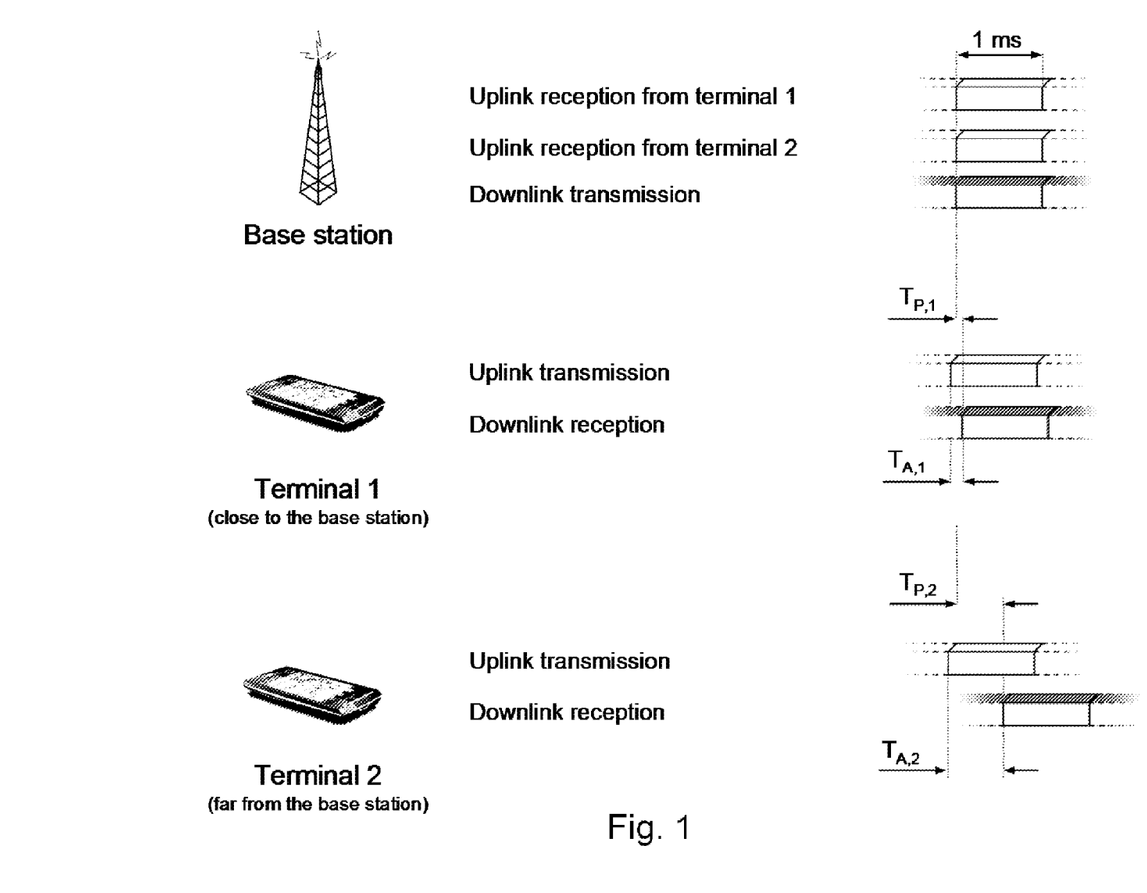
FIG. 1 is a schematic block diagram illustrating uplink timing advance in a radio communications network.

In essence, the base station is measuring the arrival time of transmissions from the UEs and, when necessary, transmitting a timing advance command to the UEs to adjust the transmission timing. At the UE, the timing of downlink, DL, transmissions is known, that is, since the UE is capable of receiving DL transmissions it has established a DL timing reference. The TA command received by the UE is used to determine the start of an UL subframe relative to the start of a DL subframe, i.e. the UL timing reference is obtained from the DL timing reference and the TA command. The propagation delay from the base station to UEs far out in a cell is larger, and therefore a larger TA is needed, compared to UEs that are located close to the base station. This is illustrated in FIG. 1.

To maintain orthogonality between the transmissions from different UE, the timing misalignment at the base station should be, significantly, less than the duration of the cyclic prefix. In OFDM-based systems, such as, e.g. LTE, a cyclic prefix is commonly used to handle time dispersion in the radio channel. Note that the cyclic prefix preferably should cover the time dispersion in the channel as well, and that the timing misalignment allowed must take this into account. If the UE has not received a TA command in a configurable time period, the UE declares the UL not to be time synchronized. This may be implemented by starting a timer, such as, a Timing Advance Timer, TAT, at each reception of a TA command. When the TAT expires, e.g. reaches zero, the UL is considered no to be time aligned.

Cellular systems, or radio communications networks, often define multiple states for the UE which matches different transmission activities. For example, in LTE, two states are defined:

RRC_IDLE, where the UE is not connected to a particular cell and no data transfer may occur in either UL or DL. In this state, the UE is in Discontinuous Reception (DRX) most of the time except for occasionally monitoring the paging channel. RRC stands for Radio Resource Control.

RRC_CONNECTED, where the UE is connected to a known cell and may receive DL transmissions. Although expressed differently in the standard specifications, this state may be considered to have two sub-states:

UL_IN_SYNC, where the UE has a valid TA value such that UL transmissions may be received without collisions between different UEs; and UL_OUT_OF_SYNC, where the UE does not have a valid TA value and hence cannot transmit data in the UL. Here, prior to any transmission, a random access must be performed to synchronize the uplink.

Furthermore, in LTE, random access is used to achieve UL time synchronization for a UE which either has not yet acquired, or has lost, its UL synchronization. Once UL synchronization is achieved for a UE, the base station, in this case, a eNodeB, may schedule orthogonal UL transmission resources for the UE.

Some examples of relevant scenarios in which the Random Access Channel, RACH, is used for the random access are therefore:

A UE in RRC_CONNECTED state, but not UL synchronized, needing to send new UL data or control information, such as, for example, an event-triggered measurement report or a hybrid Automatic Repeat Request (ARQ) acknowledgement in response to a DL data transmission;

A UE in RRC_CONNECTED state, handing over from its current serving cell to a target cell;

For positioning purposes in RRC_CONNECTED state, when TA is needed for UE positioning;

A transition from RRC_IDLE state to RRC_CONNECTED, such as, for example, for initial access or tracking area updates;

Recovering from a Radio Link Failure, RLF.

For D2D communication, it is necessary to define the transmission and reception timing. In principle, any transmission timing could be used as long as transmissions do not interfere with cellular communication. One solution is to use the same transmission timing at the UE for D2D transmissions as for cellular UL transmissions. This ensures that D2D transmissions do no collide with UL transmissions from the same UE, and also avoids a, potentially complicated, additional TA mechanism for the D2D communication.

Please note that the term 'cellular' as used herein could be further extended to an out-of-network coverage scenario, where the UEs may establish a hierarchical structure consisting of UE cluster head, CH, i.e. one UE serving as the CH, and slave UEs controlled by the UE serving as the CH. In this way, the CH in many respects behaves similar to a base station, or eNB in this case, and the concept of 'cluster' may be seen as the 'cell' in traditional cellular or radio communications network. Hence, in the following, the term 'cellular' may be also applied to the hierarchical structure of UEs comprising a CH and slave UEs.

Even in absence of a cellular connection, i.e. when the UE is in an RRC_IDLE mode, UEs may perform both D2D peer discovery and/or D2D communication data transmissions on a reserved resource pool in order to save signalling overhead for arbitrary control. Furthermore, despite that a UE does not need to maintain UL timing after the TAT has expired; UEs may still want to send D2D data. However, these communications may then add interference within the cell.

SUMMARY

It is an object of embodiments herein to provide a mechanism that enables D2D communication in an efficient manner.

According to a first aspect of embodiments herein, the object is achieved by a method performed by a first user equipment for performing Device-to-Device, D2D, communications with a second user equipment is provided. The user equipment determines that a valid timing reference is not present in the first user equipment. Also, the user equipment determine whether a preconfigured timing advance can be used in the D2D communication. Then, when determined that the preconfigured timing advance can be used, the first user equipment transmits a D2D signal to the second user equipment with a timing using the preconfigured timing advance to perform D2D communication.

According to a second aspect of embodiments herein, the object is achieved by a first user equipment for performing D2D communications with a second user equipment. The first user equipment is configured to determine that a valid timing reference is not present in the first user equipment. Also, the first user equipment is configured to determine whether a preconfigured timing advance can be used in the D2D communication. Then, when determined that the preconfigured timing advance can be used, the first user equipment is configured to transmit a D2D signal to the second user equipment with a timing using the preconfigured timing advance to perform D2D communication.

According to a third aspect of embodiments herein, the object is achieved by a method performed by a network node for enabling D2D communications between user equipments in a radio communications network. The network node determines information comprising one or more of: a list indicating in which cells a preconfigured timing advance is used, an Information Element, IE, indicating whether a preconfigured timing advance is used, and a preconfigured timing advance. Also, the network node transmits the determined information in a broadcast message to at least one of the user equipments.

According to a fourth aspect of embodiments herein, the object is achieved by a network node for enabling D2D communications between user equipments in a radio communications network. The network node is configured to determine information comprising one or more of: a list indicating in which cells a preconfigured timing advance is used, an IE indicating whether a preconfigured timing advance is used, and a preconfigured timing advance. Also, the network node is configured to transmit the determined information in a broadcast message to the user equipments.

By having a user equipment determine whether a preconfigured timing advance may be used for a D2D communication when no valid timing advance is present, the user equipment is enabled to determine how to establish correct uplink timing information for performing the D2D communication which avoids/reduces interference within a cell. Thus, a mechanism that enables D2D communication in an efficient manner is provided.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 2:
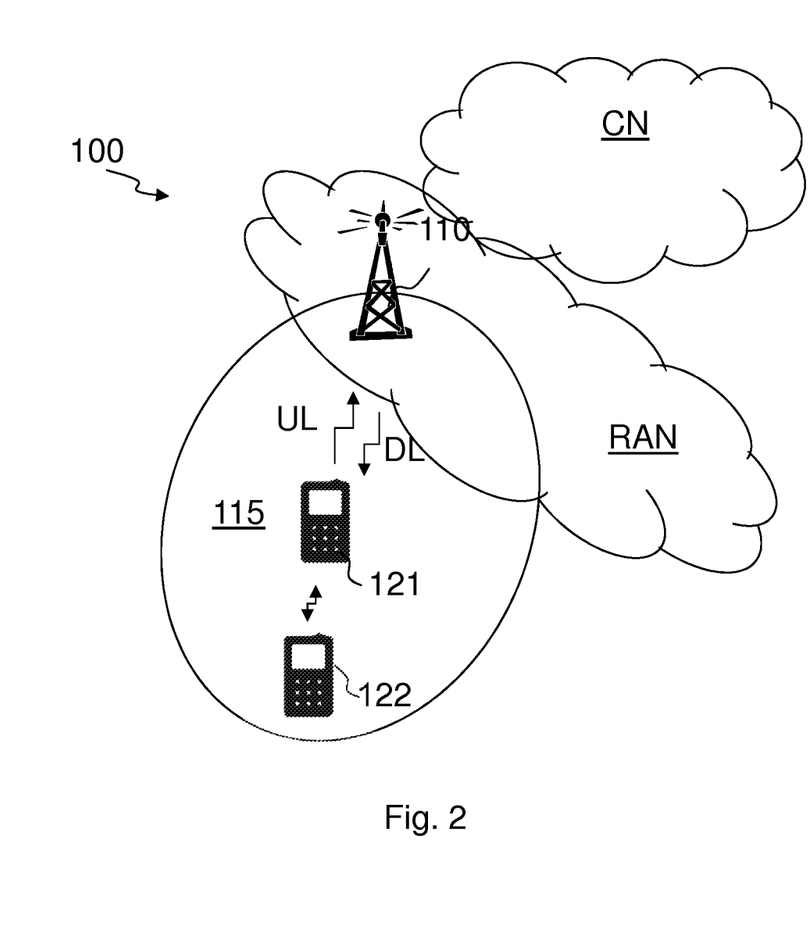
FIG. 2 is a schematic block diagram illustrating embodiments of a user equipment and network nodes in a radio communications network.

FIG. 2 is a schematic overview depicting a radio communications network 100. The radio communications network 100 comprises one or more RANs and one or more CNs. The radio communications network 100 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the radio communications network 100, a first terminal or user equipment, UE 121, also known as a mobile station and/or a wireless terminal, communicates via a Radio Access Network (RAN) to one or more core networks (CN). It should be understood by the skilled in the art that "user equipment" is a non-limiting term which means any wireless terminal, Machine Type Communication (MTC) device or node e.g. Personal Digital Assistant (PDA), laptop, mobile, sensor, relay, mobile tablets or even a small base station communicating within respective cell.

The radio communications network covers a geographical area which is divided into cell areas, e.g. a cell 115 being served by a radio base station 110. The radio base station 110 may also be referred to as a first radio base station or a network node. The radio base station 110 may be referred to as e.g. a NodeB, an evolved Node B, eNB, eNode B, a base transceiver station, Access Point Base Station, base station router, or any other network unit capable of communicating with a user equipment within the cell served by the radio base station depending e.g. on the radio access technology, RAT, and terminology used. The radio base station 110 may serve one or more cells, such as the cell 115.

A cell is a geographical area where radio coverage is provided by the radio base station equipment at a base station site. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 115 uniquely in the whole radio communications network 100 is also broadcasted in the cell 115. The radio base station 110 communicates over the air or radio interface operating on radio frequencies with the user equipment 121 within range of the radio base station 110. The user equipment 121 transmits data over the radio interface to the radio base station 110 in Uplink, UL, transmissions and the radio base station 110 transmits data over an air or radio interface to the user equipment 121 in Downlink, DL, transmissions.

In some versions of the radio communications network 100, several base stations are typically connected, e.g. by landlines or microwave, to a controller node (not shown), such as, e.g. a Radio Network Controller, RNC, or a Base Station Controller, BSC, which supervises and coordinates various activities of the plural base stations connected thereto. The RNCs are typically connected to one or more core networks.

A second terminal or user equipment, UE 122, is located in proximity of the first UE 121. This second UE 122, as well as the first UE 121, is capable of D2D communication. Please note that with the term 'D2D communication' or 'Device-to-device communication' herein is meant the transmission of beacon signals, D2D (peer) discovery and D2D communication data transmissions.

It should be noted that some embodiments herein relate to synchronization in network-assisted D2D communication. Furthermore, although embodiments below are described with reference to the scenario of FIG. 1, this scenario should not be construed as limiting to the embodiments herein, but merely as an example made for illustrative purposes.

In accordance with embodiments described herein, the issue of providing a mechanism that enables D2D communication in an efficient manner is addressed by the first UE 121, being in an idle mode or out-of-sync mode, obtaining UL timing information, such as, TA information. This may be performed by the first UE 121 either by using a pre-set, stored or preconfigured TA value or by retrieving the TA information from a radio base station/network node 110 in a random access process. The first UE 121 may then use the UL timing information in a D2D communication with the second UE 122.

This means that, before the first UE 121, being in an idle mode or an UL out-of-sync mode, is allowed to start D2D communication, including also e.g. the transmission of beacon signals, the first UE 121 should either:

perform a random access to the network node 110 to get e.g. the TA information; or assume a fixed, preferably small, value for the TA, such as, e.g. TA=0, when permitted by network signaling and/or UE measurement.

Hence, embodiments herein describes first and second UEs 121, 122, when in idle mode, e.g. RRC_IDLE, or out-of-sync mode, e.g. UL_OUT_OF_SYNC, being able to obtain a UL timing information value, e.g. TA value, and therefore being able to establish a correct UL timing in order to avoid/reduce interference within a cell, e.g. cell 115 in FIG. 1.

Example of embodiments of a method performed by the first UE 121 for performing D2D communication with the second UE 122 will now be described with reference to the flowchart depicted in FIG. 3. The embodiments relate to a method for determination of D2D transmission timing in the non-presence of valid remote node timing reference.

Figure 3:
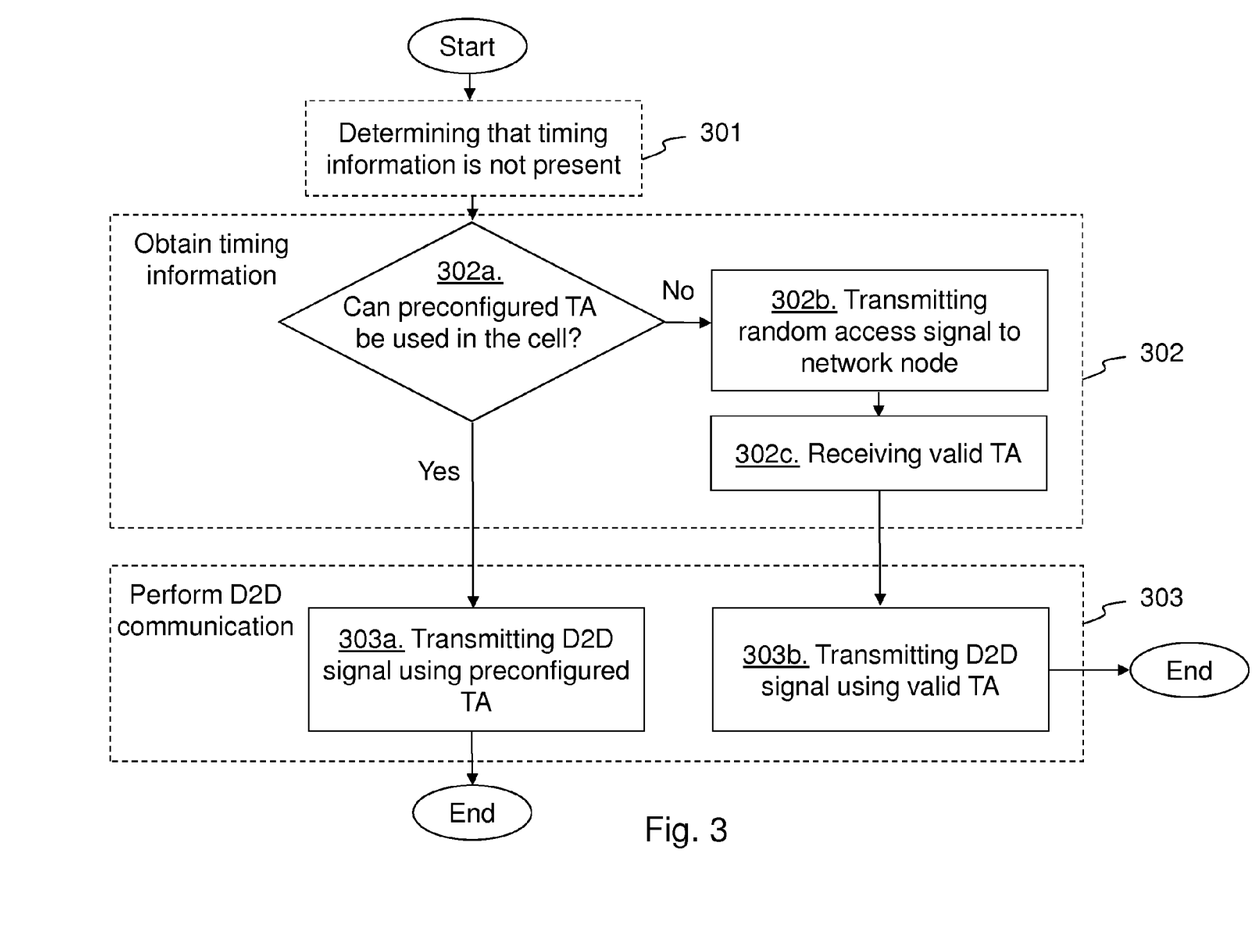
FIG. 3 is a flowchart depicting embodiments of a method in a user equipment.

FIG. 3 is an illustrated example of actions or operations which may be taken or performed by the first UE 121. The method may comprise the following actions.

Action 301

Optionally, in this action, the first UE 121 may determine that a timing information is not present, that is, determine that a valid timing reference is not present in the first UE 121. In some embodiments, the first UE 121 may not have a valid timing reference because the first UE 121 is in an idle mode, e.g. RRC_IDLE, or out-of-sync mode, e.g. UL_OUT_OF_SYNC. In this case e.g. if the first UE 121 does not have a valid uplink timing reference, such as, for example, because it is in idle mode or a too long time has passed since the last received TA command, the first UE 121 may acquire uplink synchronization prior to direct D2D communication. Two situations may be thought of when it comes to uplink synchronization, as shown in Action 302.

It should also be noted that the first UE 121 may also, prior to any D2D transmission, including transmission of beacon signals, determine whether it has a valid uplink timing reference and, if the first UE 121 has a valid uplink timing reference, then direct D2D transmissions, including beacons and synchronous random access, may take place in the resources assigned.

Action 302

In this action, the first UE 121 obtains timing information. This action comprises sub-actions 302a, 302b and 302c.

As indicated in sub-action 302a, the first UE 121 obtains timing information by determining whether a preconfigured timing advance can be used in the D2D communication. When determined that a preconfigured timing advance can be used, the first UE 121 proceeds to Action 303a.

In some embodiments, the first UE 121 may determine whether a preconfigured timing advance is used when the first UE 121 do not have a valid timing reference based on information received in a broadcast message from a network node 110. In this case, the information may comprise one or more of:
a list indicating in which cells a preconfigured timing advance is used;
a cell size;
an Information Element, IE, indicating whether a preconfigured timing advance is used;
a subframe format allocated to a D2D communication indicating that an extended cyclic prefix is used; and
a preconfigured timing advance.

In one example, information about the cell size, or, rather, whether a random access is required prior to D2D communication, may be included in the system information, SI, i.e. broadcast message. As part of the cell search procedure, the first UE 121 may obtain downlink synchronization and read the (relevant) system information to determine whether the cell size is small or large. The requirements may be indicated as cell size, or if required or not, in an information element.

In another example, or as an extension, the first UE 121 could be provided with a list, reflecting whether random access prior to D2D communication is required in each of the neighboring cells or not to reduce the delay associated with reading system information when doing cell reselection in idle mode. In some embodiments, a list where preconfigured TA is valid in a set of cells, including the camping/serving cell 115, is received from a broadcast message from the remote node, i.e. the network node 110.

With such a list, the first UE 121 could, after acquiring the cell identity of the neighboring cell, determine whether a random access is needed or not without reading the system information, SI, in the new cell. Such a list could also, as an alternative or complement to including it in the system information, be provided to the first UE 121 after, or as part of, the random access procedure when contacting the network node 110 in the first cell. Thus, the list indicating whether random access is required may be transmitted from the network node 110, i.e. radio base station/eNB/CH 110, to the first UE 121 and/or the second UE 122.

In a further example, or as an extension, this information on whether a preconfigured or fixed TA may be assumed or not could be subframe specific, and this subframe partition information may be included in the system information as well. For example, a set of subframes is configured to use extended CP despite not motivated by the propagation conditions, e.g. 16.7 µs, where only 5 µs for time dispersion, to absorb more timing difference, i.e. 11.7 µs margin provides 1.75 km coverage, especially for beacon transmission. As a further extension, if inter-cell/cluster sync is available, this fixed TA subframe set configuration, e.g. TA=0, may be common/coordinated for neighboring cells, which means the fixed/zero TA beacon Tx/Rx, i.e. transmission and reception, or actual D2D peer discovery, may be even achieved for an inter-cell/cluster scenario.

Furthermore, in some embodiments, the first UE 121 may also determine that a preconfigured timing advance can be used when received signal strength measurements in the first UE 121 is above a threshold. In other words, UE measurements may be used to differentiate whether zero TA may be applied or not, for example, if the received Reference Signal Received Power, RSRP, is larger than a specific threshold. The RSRP here being a measure of downlink signal strength used for, e.g. handover in LTE, and the specific threshold being is broadcasted in the system information. In this case, zero TA may be applied directly.

Furthermore, in some embodiments, the usage of preconfigured TA for the camping/serving cell 115 may be determined based on signal strength measurements of received signal from the camping/serving cell 115. In this case, a preconfigured TA is determined to be used if the signal strength is above a threshold.

Otherwise, a random access is required to obtain the non-zero TA command from the network node 110. In other words, if not a preconfigured TA is used in the cell, transmit a random access to the remote node, i.e. the network node 110, and receive a TA from the network node 110. This enables the first UE 121 to transmit the D2D signal according to the received transmit timing, as shown in Action 303.

As indicated in sub-action 302b, when determined that a preconfigured timing advance cannot be used, the first UE 121 may, in some embodiments, obtains timing information by transmitting a random access signal to a network node 110.

As indicated in sub-action 302c, the first UE 121 may, in this case, also receive a valid timing advance from the network node 110.

It should also be noted that the network node 110 referred to may also be another UE acting as a Cluster Head, CH, to which the first UE 121 is a slave UE. In other words, the preconfigured TA for the camping/serving cell, i.e. cell 115, is received from a broadcast message from the network node 110, such as, the radio base station/eNB/CH 110 or another RAN node. The network node 110 may be a eNodeB, eNB or a Cluster Head, CH. Also, in some embodiments, the timing advance, TA, may be a fixed and/or zero value.

In some embodiments, the first UE 121 may determine whether a preconfigured TA is used in the cell 115. The determination of whether a preconfigured TA may be used may be performed based on a sub frame format allocated to a D2D communication. In some embodiments, the first UE 121 may determine that a preconfigured TA may be used if a long cyclic prefix, CP, is used in D2D subframes.

Action 303

In this action, the user equipment 121 performs D2D communication. This action comprises sub-actions 303*a* and 303*b*.

As indicated in sub-action 303*a*, this is performed by the first UE 121 by, when determined that a preconfigured timing advance can be used, i.e. as in Action 302, transmitting a D2D signal to the second UE 122 with a timing using the preconfigured timing advance to perform D2D communication.

In other words, if a preconfigured TA is used, the first UE 121 transmits the D2D signal with a timing according to the preconfigured value to the second UE 122.

This is because, in case of smaller cell sizes, longer cyclic prefix, CP, margin and less time dispersion in the channel, the TA required may be absorbed by the CP. This is shown in the example of FIG. 4.

Figure 4:
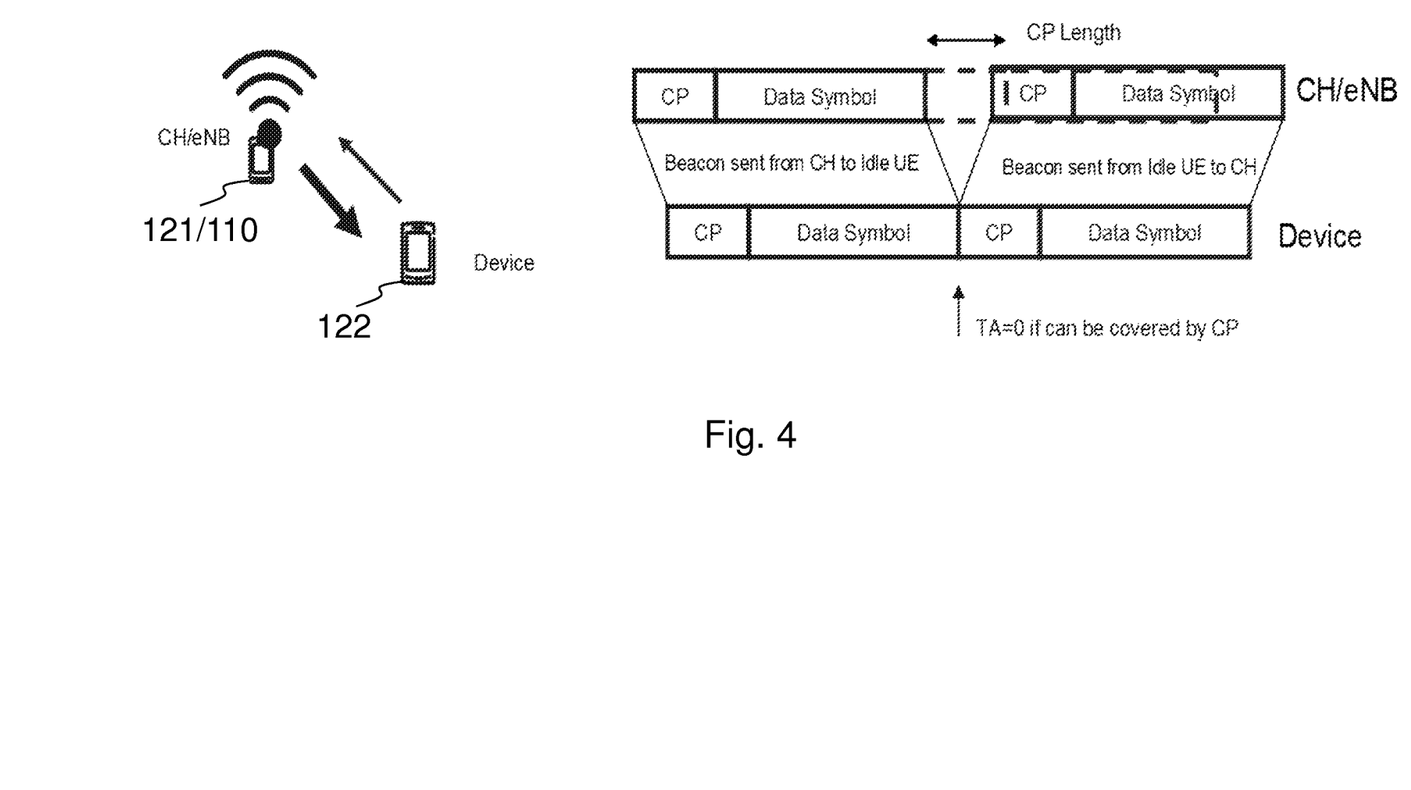
FIG. 4 is a schematic block diagram illustrating cyclic prefixes.

FIG. 4 shows an example of cyclic prefixes absorbing timing uncertainties and the use of a preconfigured timing advance of zero, i.e. TA=0. Here, a TA of zero, or another small predefined value, is sufficient in these situations to ensure that the timing misalignment at the network node 110, e.g. eNB or CH, is significantly smaller than the duration of the cyclic prefix, CP. According to embodiments herein, this may be exploited to avoid the random access step, irrespective of the state of the first UE 121, prior to the D2D transmissions.

As indicated in sub-action 303*b*, when a valid timing advance has been received from the network node 110, i.e. as in sub-action 302*c*, the first UE 121 may perform D2D communication by transmitting a D2D signal to the second UE 122 with a timing using the received valid timing advance.

This means that obtaining uplink timing synchronization by performing a random access procedure and receiving a TA command from the network node 110, e.g. the radio base station/eNB/CH 110, is always a valid option. In some cases, it is also necessary.

Once the UL timing reference is established, direct D2D transmissions may take place in the resources assigned. It should be clarified that the random access procedure mentioned herein refers to transmission of an uplink message followed by at least one response from the network node 110 consisting of at least a TA command. The random access channel for D2D operation mentioned herein might carry different content, format and have transmission procedure as compared to the random access channels conventionally employed for cellular operations.

It should be noted that the UE 121 may transmit the D2D signal on a channel for D2D operation.

An advantage with the embodiments mentioned herein, is that one may ensure that D2D transmission is synchronized with the network UL timing, and hence unnecessary interference from D2D between two UEs, e.g. first and second UE 121, 122, on a third device's network communication is avoided.

Figure 5:
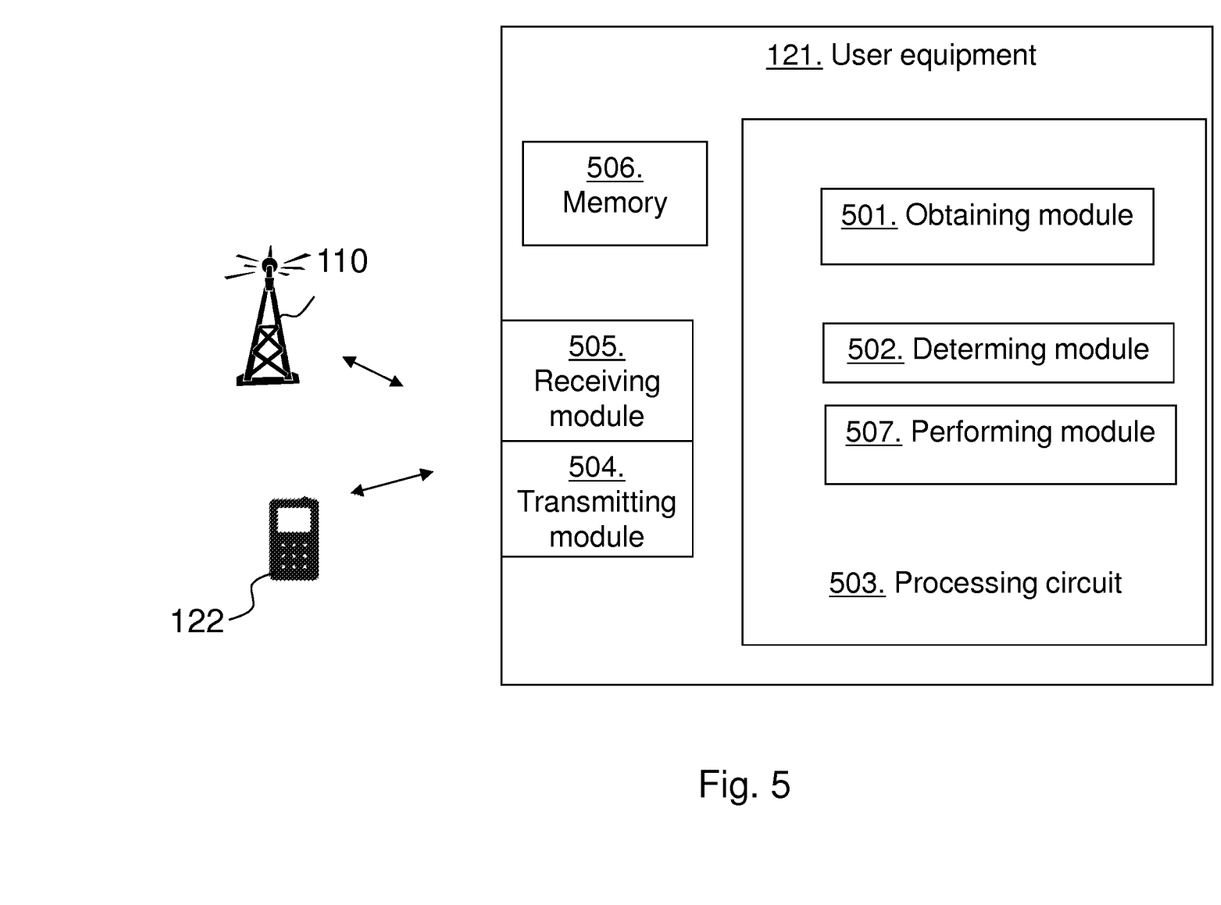
FIG. 5 is a schematic block diagram depicting embodiments of a user equipment.

To perform the method actions in the first UE 121 for performing D2D communications with the second UE 122, the first UE 121 may comprise the following arrangement depicted in FIG. 5. The first and second UE 121, 122 are configured to be in a radio communications network 100, e.g. as shown in FIG. 2.

FIG. 5 shows a schematic block diagram of embodiments of the first UE 121. In some embodiments, the first UE 121 may comprise an obtaining module 501, a determining module 502, and a performing module 507, which may also be referred to as circuits. In some embodiments, the first UE 121 may comprise a processing circuit 503, which may also be referred to as processing module, processing unit or processor. The processing circuit 610 may comprise one or more of the obtaining module 501, the determining module 502, and the performing module 507, and/or perform the function thereof described below.

The first UE 121 is configured to, or comprises the determining module 502 being configured to, determine that a valid timing reference is not present in the first user equipment. Also, the first UE 121 is configured to, or comprises the obtaining module 501 being configured to, determine whether a preconfigured timing advance can be used in the D2D communication. Furthermore, the first UE 121 is configured to, or comprises the performing module 507 being configured to, transmit a D2D signal to the second user equipment 122 with a timing using the preconfigured timing advance to perform D2D communication when determined that the preconfigured timing advance can be used.

In some embodiments, the first UE 121 or obtaining circuit 501 may be further configured to determine whether a preconfigured timing advance can be used when the first UE 121 do not have a valid timing reference based on information received in a broadcast message from a network node 110. In this case, the information may comprise one or more of: a list indicating in which cells a preconfigured timing advance is used; a cell size; an Information Element, IE, indicating whether a preconfigured timing advance is used; a subframe format allocated to a D2D communication indicating that an extended cyclic prefix is used; and a preconfigured timing advance.

In some embodiments, the first UE 121 or obtaining module 501 may be further configured to determine that a preconfigured timing advance is used when a received signal strength measurements in the first UE 121 is above a threshold.

In some embodiments, the first UE 121 or obtaining module 501 may be further configured to, when determined that a preconfigured timing advance cannot be used, transmit a random access signal to a network node 110. In this case, the first UE 121 or obtaining module 501 may also be further configured receive a valid timing advance from the network node 110. Furthermore, in this case, the first UE 121 or performing module 507 may be further configured to transmit a D2D signal to the second UE 122 with a timing using the received valid timing advance.

Also, in some embodiments, the timing advance, TA, may be a fixed and/or zero value.

In some embodiments, the first UE 121 or performing module 507 may be further configured to perform the transmitting of the D2D signal to the second UE 122 with a timing using the preconfigured timing advance in order to perform D2D communication on a channel for D2D operation.

In some embodiments, the first UE 121 may not have a valid timing reference because the first UE 121 is in an idle mode, e.g. RRC_IDLE, or out-of-sync mode, e.g. UL_OUT_OF_SYNC.

In other words, a wireless device, e.g. the first UE 121, is provided to perform the methods disclosed herein. The first UE 121 is capable of D2D communication with a second wireless device, e.g. the second UE 122. The first UE 121 is configured, when being in a mode when the first UE 121 has no valid remote node timing reference, to obtain a network timing reference. In one example, the first UE 121 may comprise an obtaining circuit 501 configured to obtain uplink timing before communicating with the second UE 122. The first UE 121 may additionally or alternatively comprise a determining circuit 502 configured to determine whether a preconfigured TA is used in the cell 115. That being the case, the first UE 121 may perform D2D transmission with the second UE 122 using the preconfigured TA in a performing circuit 507.

The first UE 121 further comprises a transmitting module 504 and a receiving module 505, which may also be referred to as circuits. In other words, the first UE 121 may comprise a transmitting circuit 504 configured to transmit data to the second UE 122 and/or the radio base station/eNB/CH 110. The first UE 121 may further comprise a receiving circuit 505 configured to receive communication or data from the second UE 122 and/or the radio base station/eNB/CH 110.

The embodiments for performing D2D communications with another user equipment, i.e. the second UE 122, may be implemented through one or more processors, such as, e.g. the processing circuitry 503 in the first UE 121 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 503 in the first UE 121. The computer program code may e.g. be provided as pure program code in the first UE 121 or on a server and downloaded to the first UE 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the first UE 121 may further comprise a memory 506, which may be referred to or comprise one or more memory modules or units. The memory 506 may be arranged to be used to store executable instructions and data, such as, e.g. Timing Advances, TAs, preconfigured TAs, etc., to perform the methods described herein when being executed in the first UE 121. Those skilled in the art will also appreciate that the processing circuitry 503 and the memory 506 described above may refer to a combination of analog and digital circuits, and/or one or more processors configured with software and/or firmware, e.g. stored in the memory 506, that when executed by the one or more processors such as the processing circuitry 503 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In other words, the first UE 121 may comprise a memory 506 that may comprise one or more memory units and may be used to store, for example, data such as lists, preconfigured TA or TA, applications to perform the methods herein when being executed on the first UE 121 or similar. The embodiments herein for enabling D2D communication may be implemented through one or more processors, such as a processing circuit 503 in the first UE 121, together with computer program code for performing the functions and/or method steps of the embodiments herein. The program code mentioned above may also be provided as a computer program product, for instance in the form of a data carrier carrying computer program code for performing embodiments herein when being loaded into the first UE 121. One such carrier may be in the form of a CD ROM disc. It is however feasible with other data carriers such as a memory stick. The computer program code may furthermore be provided as pure program code on a server and downloaded to the first UE 121.

Those skilled in the art will also appreciate that the various "circuits" described may refer to a combination of analog and digital circuits, and/or one or more processors configured with software and/or firmware (e.g., stored in memory) that, when executed by the one or more processors, perform as described above.

Example of embodiments of a method performed by a network node 110 for enabling D2D communications between user equipments, i.e. the first and second UE 121, 122, in a radio communications network 100, will now be described with reference to the flowchart depicted in FIG. 6.

Figure 6:
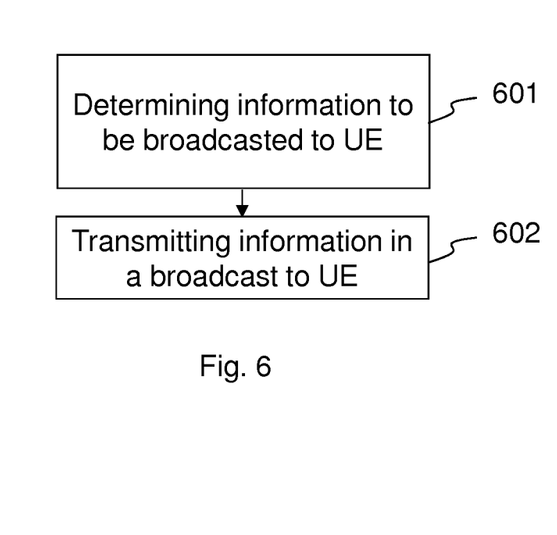
FIG. 6 is a flowchart depicting embodiments of a method in a network node.

FIG. 6 is an illustrated example of actions or operations which may be taken by the network node 110 or a UE acting as a Cluster Head, CH. However, it should also be noted that these actions or operations may also be performed by a centralized network node in the radio communications network 100, such as, e.g. a core network node, a radio network controller, a Radio Resource Management, RRM, server, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 601

In this action, the network node 110 determines information to be broadcasted to the first UEs, that is, the network node 110 determines information comprising one or more of: a list indicating in which cells a preconfigured timing advance is used; an Information Element, IE, indicating whether a preconfigured timing advance is used; and a preconfigured timing advance.

Action 602

In this action, the network node 110 transmits information in a broadcast to the UEs, that is, the network node 110 transmits the determined information in a broadcast message to at least one of the user equipments, i.e. the first and second UE 121, 122.

Figure 7:
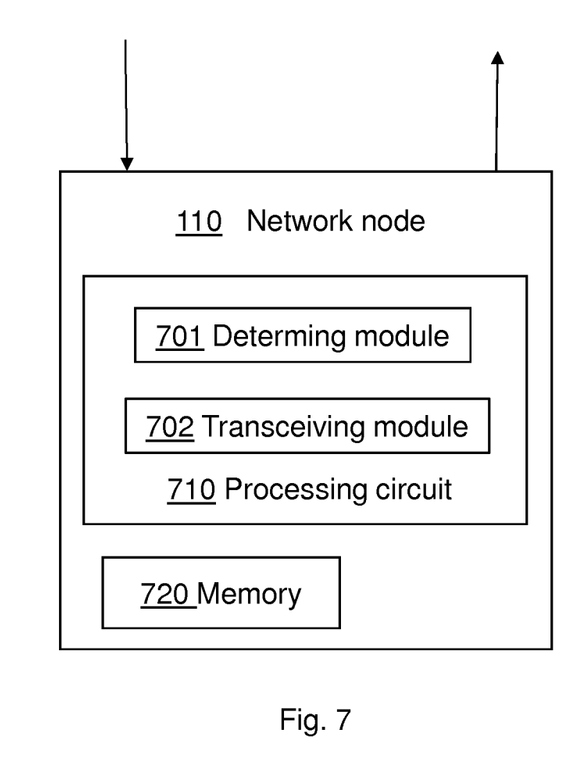
FIG. 7 is a schematic block diagram depicting embodiments of a network node.

To perform the method actions in the network node 110 for enabling D2D communications between user equipments, i.e. the first and second UE 121, 122, in a radio communications network 100, the network node 110 may comprise the following arrangement depicted in FIG. 7. The network node 110 is configured to be in a wireless communications network, such as, e.g. the radio communications network 100 in FIG. 1.

FIG. 7 shows a schematic block diagram of embodiments of the network node 110. In some embodiments, the network node 110 may comprise a determining module 701, and a transceiving module 702. In some embodiments, the network node 110 may comprise a processing circuit 710, which may also be referred to as processing module, processing unit or processor. The processing circuit 710 may comprise one or more of the determining module 701 and transceiving module 702, and/or perform the function thereof described below. In some embodiments, the network node 110 may be a UE acting as a Cluster Head, CH.

The network node 110 is configured to, or comprises a determining module 701 being configured to, determine information comprising one or more of: a list indicating in which cells a preconfigured timing advance is used, an Information Element, IE, indicating whether a preconfigured timing advance is used, and a preconfigured timing advance. Also, the network node 110 is configured to, or comprises a transceiving module 702 being configured to, transmit the determined information in a broadcast message to the user equipments, i.e. the first and second UE 121, 122.

The embodiments for enabling D2D communications between user equipments, i.e. the first and second UE 121, 122, may be implemented through one or more processors, such as, e.g. the processing circuitry 710 in the network node 110 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 720, which may be referred to or comprise one or more memory modules or units. The memory 720 may be arranged to be used to store executable instructions and data, such as, e.g. a list indicating in which cells a preconfigured timing advance is used, an IE indicating whether a preconfigured timing advance is used, preconfigured timing advances, TAs, etc., to perform the methods described herein when being executed in the network node 110. Those skilled in the art will also appreciate that the processing circuitry 710 and the memory 720 described above may refer to a combination of analog and digital circuits, and/or one or more processors configured with software and/or firmware, e.g. stored in the memory 720, that when executed by the one or more processors such as the processing circuitry 710 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described the methods, the network node 110, and user equipment 121, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a first user equipment for performing a Device-to-Device (D2D) communication with a second user equipment, the method comprising:
   determining that a valid timing reference for cellular network synchronization with a cellular network is not present in the first user equipment, wherein the first user equipment does not have a valid timing reference because the first user equipment is in an idle mode or out-of-sync mode;
   determining whether a preconfigured timing advance for cellular network synchronization with the cellular network can be used in the D2D communication; and
   when determined that the preconfigured timing advance can be used, transmitting a D2D signal to the second user equipment with a timing using the preconfigured timing advance in the D2D communication.

2. The method according to claim 1, wherein determining whether a preconfigured timing advance can be used in the D2D communication is performed based on information received in a broadcast message from a network node.

3. The method according to claim 2, wherein the information comprises one or more of:
   a list indicating in which cells the preconfigured timing advance is used;
   a cell size;
   an Information Element (IE) indicating whether the preconfigured timing advance is used;
   a subframe format allocated to a D2D communication indicating that an extended cyclic prefix is used; and
   the preconfigured timing advance.

4. The method according to claim 1, wherein the determining further comprises determining that a preconfigured timing advance can be used when received signal strength measurements in the first user equipment are above a threshold.

5. The method according to claim 1, further comprising
when determined that a preconfigured timing advance is not used, transmitting a random access signal to a network node,
receiving a valid timing advance from the network node, and
transmitting a D2D signal to the other user equipment with a timing using the received valid timing advance.

6. The method according to claim 5, wherein the timing advance is a fixed and/or zero value.

7. The method according to claim 1, wherein the transmitting is performed on a channel for D2D operation.

8. A first user equipment comprising a processing circuit for performing Device-to-Device (D2D) communications with a second user equipment, wherein the processing circuit in the first user equipment is configured to determine that a valid timing reference for cellular network synchronization with a cellular network is not present in the first user equipment where the first user equipment does not have a valid timing reference because the first user equipment is in an idle mode or out-of-sync mode, determine whether a preconfigured timing advance for cellular network synchronization with the cellular network can be used in the D2D communication, and when determined that the preconfigured timing advance can be used, transmit a D2D signal to the second user equipment with a timing using the preconfigured timing advance to perform D2D communication.

9. The first user equipment according to claim 8, further configured to determine whether a preconfigured timing reference can be used, wherein the determining is performed based on information received in a broadcast message from a network node.

10. The first user equipment according to claim 9, wherein the information comprises one or more of:
a list indicating in which cells the preconfigured timing advance is used;
a cell size;
an Information Element (IE) indicating whether the preconfigured timing advance is used;
a subframe format allocated to a D2D communication indicating that an extended cyclic prefix is used; and
the preconfigured timing advance.

11. The first user equipment according to claim 8, further configured to determine that a preconfigured timing advance is used when received signal strength measurements are above a threshold.

12. The first user equipment according to claim 8, further configured to, when determined that a preconfigured timing advance cannot be used, transmit a random access signal to a network node, receive a valid timing advance from the network node, and transmit a D2D signal to the other user equipment with a timing using the received valid timing advance.

13. The first user equipment according to claim 12, wherein the timing advance is a fixed and/or zero value.

14. The first user equipment according to claim 8, further configured to perform the transmitting of the D2D signal to the second user equipment with a timing using the preconfigured timing advance in order to perform D2D communication on a channel for D2D operation.

15. A method performed by a network node for enabling Device-to-Device (D2D) communications between user equipments in a radio communications network, the method comprising determining information comprising:
a list indicating in which cells a preconfigured timing advance is used and one or more of:
an Information Element (IE) indicating whether a preconfigured timing advance is used; and
a preconfigured timing advance; and
transmitting the determined information in a broadcast message to at least one of the user equipments.

16. A network node for enabling Device-to-Device (D2D) communications between user equipments in a radio communications network, the network node comprising:
memory;
a transceiver; and
a processor associated with the transceiver, wherein the processor is configured to:
determine information comprising:
a list indicating in which cells a preconfigured timing advance is used and one or more of:
an Information Element (IE) indicating whether a preconfigured timing advance is used; and
a preconfigured timing advance; and
transmit the determined information in a broadcast message to the user equipments.

* * * * *